United States Patent [19]
Kwak

[11] Patent Number: 5,501,587
[45] Date of Patent: Mar. 26, 1996

[54] MOLDING MACHINE FOR SEMICONDUCTOR PACKAGE

[75] Inventor: Nho K. Kwak, Incheon, Rep. of Korea

[73] Assignee: Han-Mi Mold & Tool, Co., Ltd., Incheon, Rep. of Korea

[21] Appl. No.: 299,901

[22] Filed: Sep. 1, 1994

[30] Foreign Application Priority Data

Sep. 4, 1993 [KR] Rep. of Korea .................. 93-17572

[51] Int. Cl.⁶ .......................... B29C 45/02; B29C 45/14
[52] U.S. Cl. .................. 425/116; 425/129.1; 425/145; 425/185; 425/190; 425/544; 264/272.17
[58] Field of Search .................. 425/116, 120, 425/121, 129.1, 145, 544, 588, DIG. 228, 185, 183, 190, 186; 264/272.17, 328.8

[56] References Cited

U.S. PATENT DOCUMENTS

| | | | |
|---|---|---|---|
| 4,511,317 | 4/1985 | Bandoh | 425/116 |
| 4,615,857 | 10/1986 | Baird | 425/116 |
| 4,632,653 | 12/1986 | Plocher | 425/129.1 |
| 4,723,899 | 2/1988 | Osada | 425/544 |
| 5,326,243 | 7/1994 | Fierkens | 425/116 |

*Primary Examiner*—Khanh P. Nguyen
*Attorney, Agent, or Firm*—Michael N. Meller

[57] ABSTRACT

A molding machine is provided for a semiconductor package. The machine has two transfer rods for compressing resin into a leadframe of the mold. One transfer rod will move resin into the mold when the rod is moved downward and the second transfer rod will move resin into the mold when the rod is moves upwardly. Means are provided for selectively operating the transfer rods as needed depending on the type of mold used.

2 Claims, 4 Drawing Sheets

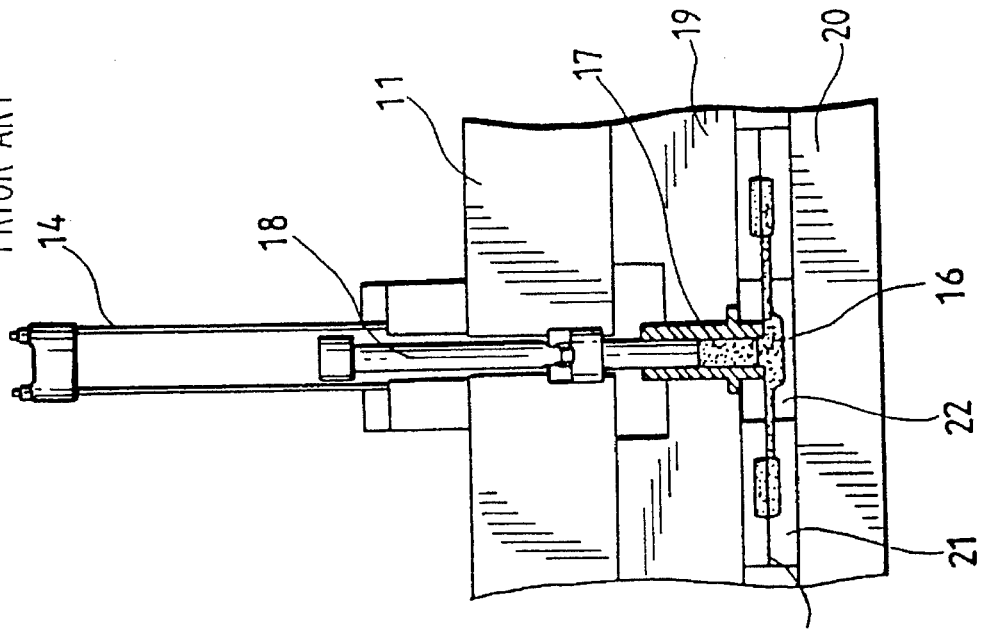
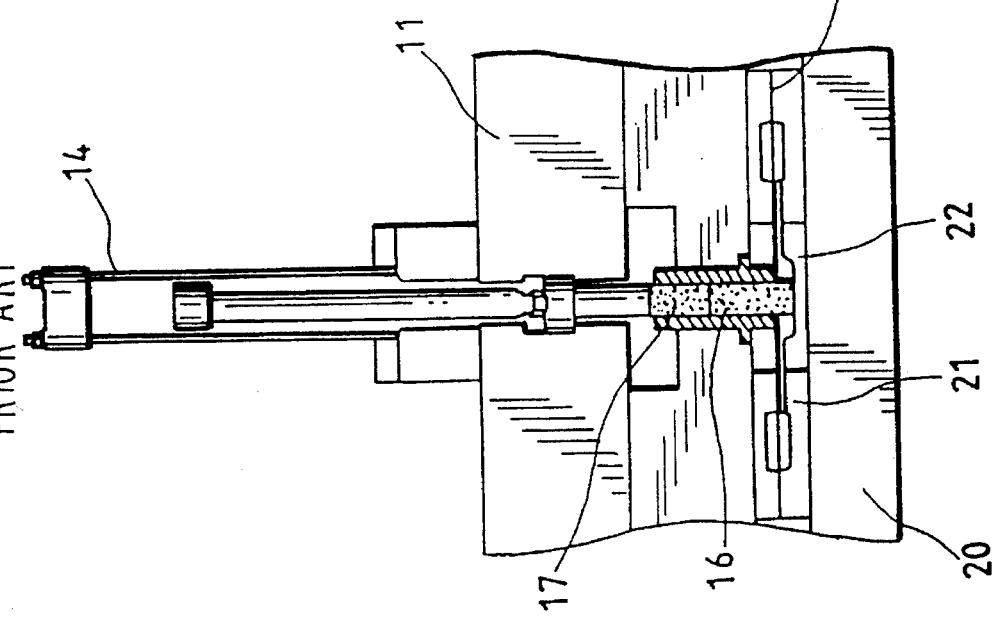

MOLDING MACHINE FOR SEMICONDUCTOR PACKAGE

BACKGROUND OF THE INVENTION

This invention relates to a molding machine for semiconductor package. It particularly relates to a molding machine having a port for compressive resin, which can mold a semiconductor package whether the port is located on a top side of the mold or on a bottom side of the mold.

Generally, a molding machine for semiconductor package molds resin-compound into a leadframe of a semiconductor after finishing a wire bonding and a die bonding, so as to protect the welding of the leadframe and a semiconductor chip.

Conventionally, a molding machine comprises a guiding rod (10), a top plate (11) fixed on an end of the rod (10), a moving plate (12) moving along the rod (10), a mold (13) between the top plate (11) and the moving plate (12), a transfer-rod (18) having a flanger tip (17) for pressing resin (16) into the leadframe (15) fed into the mold (13) and a hydraulic cylinder (14) moving the transfer-rod (18) as shown in FIG. 3 and 4.

Accordingly, the moving plate (12) is raised along the guiding rod (10), so to the upper mold (19) and the lower mold (20) is closed, and supplies resin (16), to be preheated, into a port (23) via an inlet (24) for resin (24) formed between the upper mold (19) and the top plate (11). Then a molding of a semiconductor package is accomplished while resin (16) in the port (16) wrap around a semiconductor chip arranged in a cavity block (21) via a runner formed in a runner block (22), when the flanger tip (17) of the transfer-rod (18) is moving downward (as shown in FIGS. 4(A) and 4(B)).

In the foregoing process of molding, when the resin (16) is fed to the semiconductor chip via the inlet (24) and the port (23), resin (16) for molding of the semiconductor chip should be supplied to the port (23) while the flanger tip (17) of the transfer-rod (18) is completely free from the inlet (24) formed between the upper mold (19) and the top plate (11). Consequently, since a stroke of the flanger tip (17) is long, the molding productivity is decreased. Also since an air layer between resin (16) and the flanger tip (17) is long, blowholes are frequently formed in the package and/or a wire connecting the lead and the chip bends.

Furthermore, since resin (16) is inserted into an aperture formed by a difference of temperature between the port (23) and the flanger tip (17), abrasion between the port (23) and the flanger tip (17) is increased, and sometimes it may cause the molding machine to stop operating.

In view of the foregoing, considerable effort has been expended to provide a molding machine for a semiconductor package that may produce an accurate semiconductor package.

For example, a molding machine may comprise a hydraulic cylinder (14) that is selectively run by a controller (not shown) in the bottom part of the moving plate (12); a transfer-rod (2) that is moved upwardly by the hydraulic cylinder (1); and a flanger tip (5) may compress resin (16) that is filled in the port about half degree, in which the port arranged in the lower mold (20). In such molding machine, the problem exists that the molding machine having a transfer-rod in the top portion and the molding machine having a transfer-rod in the bottom portion is required since the flanger tip (17) supplies resin into the mold when moving downward in the conventional mold. Consequently, it is inconvenient in purchase, manufacturing and installation, since 2 types of molding machines having different way of transfer are needed.

SUMMARY OF THE INVENTION

It is therefore an object of this invention to provide a molding machine for a semiconductor package that may selectively move the transfer-rods as needed so to use either mold into which a flanger tip supplies resin when moving from downward as in the conventional mold or a mold into which a flanger tip supplies resin when moving upwardly.

It is an aspect of the invention that a molding machine for a semiconductor package comprising at least a first and a second transfer rod for moving resin into a leadframe of a mold for a semiconductor package, said first transfer rod being operative when said first rod is moved in a downward direction towards the mold and said second transfer rod being operative when said transfer rod is being moved in an upward direction towards the mold; and means for selectively controlling the movement and operation of said first and second transfer rods.

It is another aspect of the invention that a molding machine for packaging a semiconductor comprising a fixed top plate member arranged in a substantially horizontal direction, guiding rod means having at least one end thereof attached to said top plate member and being substantially perpendicular thereto, a movable plate member movably mounted on said guiding rod means and being movable in an upward and downward direction, a first transfer rod arranged in said top plate member and having a flanger tip adapted to press resin into a leadframe of a mold, a first hydraulic cylinder adapted to move said first transfer rod to move resin into a mold when said transfer rod is moved downward, a second transfer rod arranged in said movable plate member and having a flanger tip adapted to compress resin into a leadframe of a mold when said transfer rod is moved upwardly, a second hydraulic cylinder arranged below said movable plate for selectively moving said movable plate and said second transfer rod upwardly and downward, and a controller for selectively controlling the movement of said first and second hydraulic cylinders whereby when a mold having a leadframe for packaging a semiconductor is arranged between said fixed and movable plates, resin may be compressed into said leadframe by moving said first transfer rod downward and/or by moving said second transfer rod upwardly.

BRIEF DESCRIPTION OF THE DRAWINGS

The above and other objects and advantages of the invention will be apparent upon consideration of the following detailed description, taken in conjunction with the accompanying drawings, in which like reference numbers refer to like parts throughout, and in which:

FIG. 4(A) and FIG. 4(B) are illustrative views of a transfer-rod shown in FIG. 3.

DETAILED DESCRIPTION OF THE INVENTION

Figure 1:
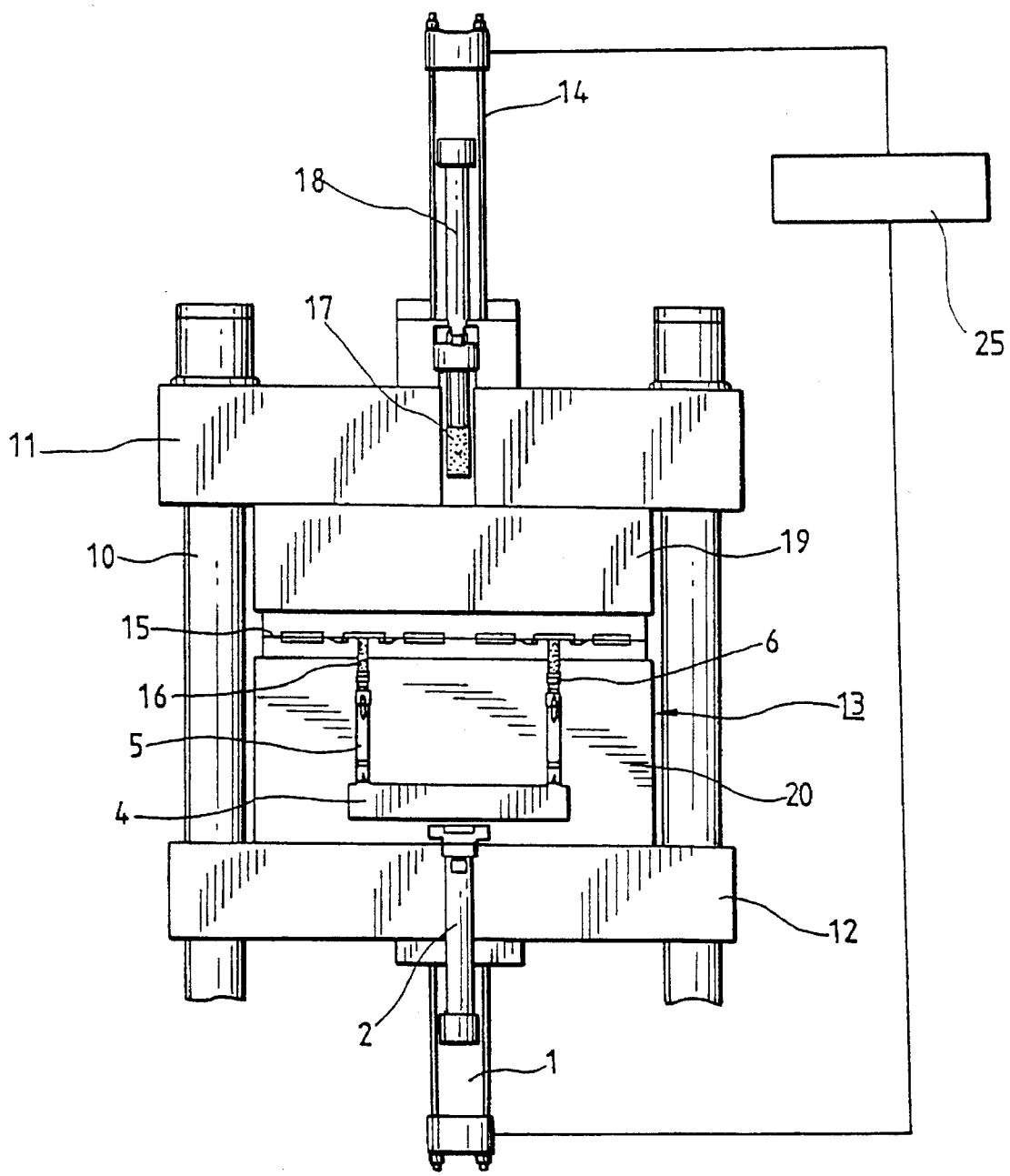
FIG. 1 is a front view, partially in section, of a molding machine for semiconductor package according to an embodiment of the present invention.
Figure 2:
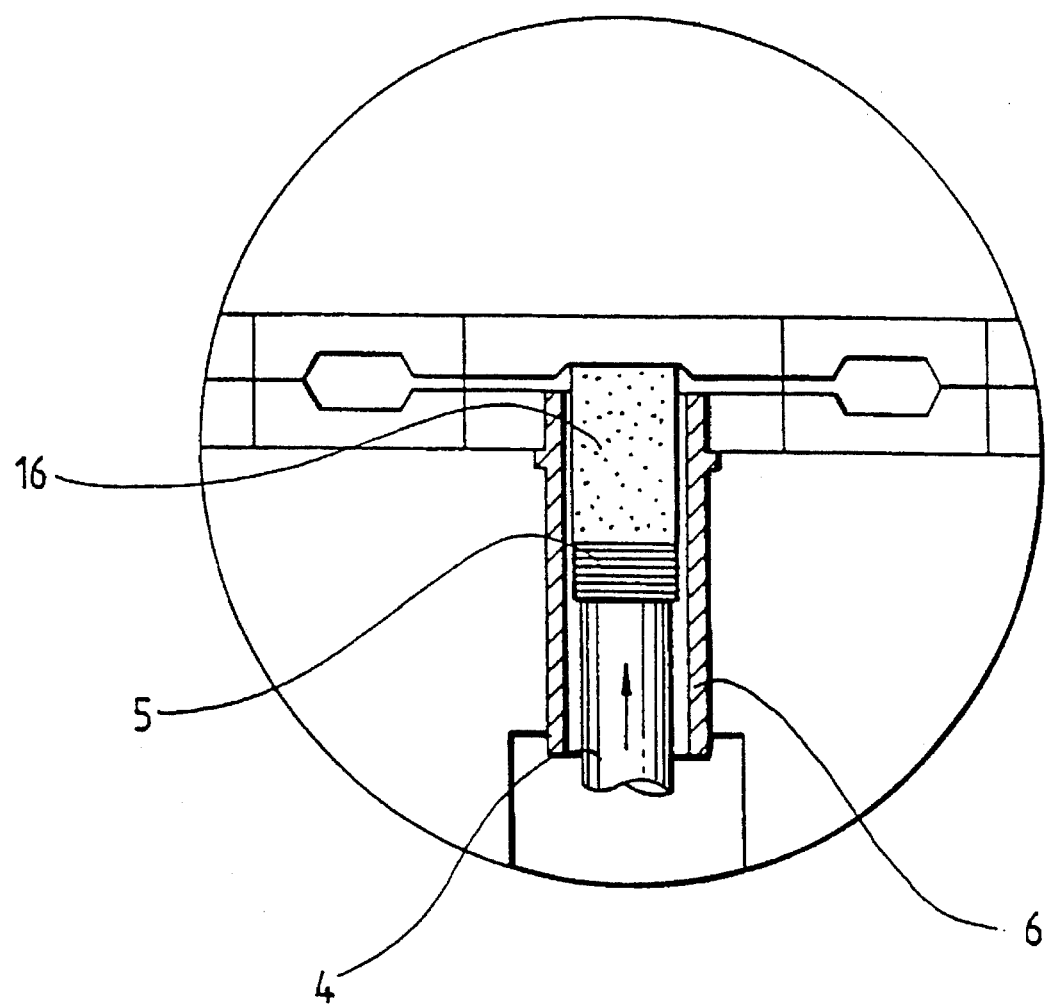
FIG. 2 is an enlarged view of a flanger shown in FIG. 1.
Figure 3:
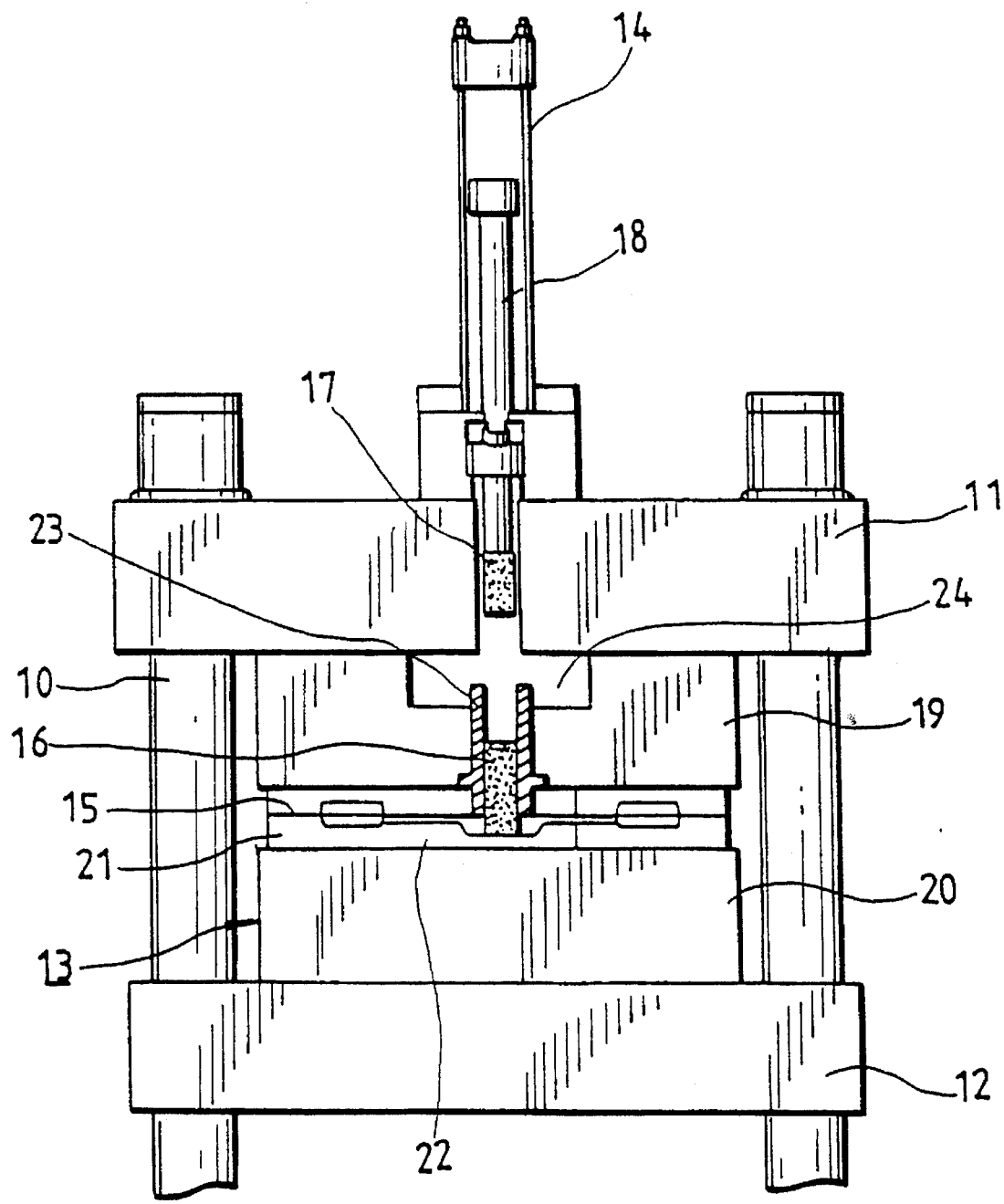
FIG. 3 is a front view, partially in section, of a conventional molding machine.

Referring to the drawing, FIG. 1 shows a molding machine according to an embodiment of the invention. A mold (13) is provided between the top plate (11) fixed on an end of guiding rod means (10) and a movable plate (12) that is movable along the guiding rod (10). An upper transfer-rod (18) having a flanger tip (17) is provided on the top plate (11) and presses resin (16) into a leadframe (15) from the opposite side of the mold. A lower transfer-rod (2) is provided in the bottom portion of the movable plate (12) and can be moved upwardly by a hydraulic cylinder (1), wherein the hydraulic cylinders (1) and (14) are selectively controlled by a controller (25). A flanger tip (5) compress resin (16) filled in the port (6) about half degree via a flanger (4) and a moving block (3) combined with the transfer-rod (2) ( wherein the port arranged in the bottom portion of the mold, as shown in FIG. 2).

Accordingly, when resin (16) is compressed into the mold having the port (23) arranged in the upper mold (19), the hydraulic cylinder (14) and the transfer-rod (18) are used. On the contrary when resin (16) is compressed into the mold which has a port (6) arranged in the lower mold, the hydraulic cylinder (1) and the bottom transfer-rod (2) are used.

According to the illustrated embodiment of the present invention, present molding machine for a semiconductor package may selectively move the transfer-rods as needed so as to use either a mold into which a flanger tip (17) supplies resin when moving downward as in the conventional mold or a mold into which a flanger tip (5) supplies resin when moving upwardly. Therefore the present molding machine may reduce the cost and space for equipment, since two types of transfer-rods are provided in a molding machine.

I claim:

1. A molding machine for a semiconductor package, said molding machine being adapted to interchangeably and selectively work with a first mold having an upper port for receiving a first molding resin and a first molding cavity communicating with said upper port and with a second mold having a lower port for receiving a second molding resin and a second molding cavity communicating with said lower port comprising;

at least a first and a second transfer rod for respectively and selectively moving resin into said molding cavities of said first and second molds, said first transfer rod being operative to compress said first resin into said first cavity when said first rod is moved in a downward direction towards said upper port of said first mold and said second transfer rod being operative to compress said second resin into said second cavity when said transfer rod is moved in an upward direction towards said lower port of said second mold; and means for selectively controlling the movement and operation of said first and second transfer rods.

2. A molding machine for packaging a semiconductor said molding machine being adapted to interchangeably and selectively work with a first mold having an upper port for receiving a first molding resin and a first molding cavity communicating with said upper port and a second mold having a lower port for receiving a second molding resin and a second molding cavity communicating with said lower port comprising:

a fixed top plate member arranged in a substantially horizontal direction;

guiding rod means having at least one end thereof attached to said top plate member and being substantially perpendicular thereto;

a movable plate member movably mounted on said guiding rod means and being movable in an upward and downward direction towards and away from said fixed top plate member in a path controlled by said guiding rod means;

a first transfer rod arranged in said top plate member and having a flanger tip adapted to compress resin into said first molding cavity;

a first hydraulic cylinder adapted to move said first transfer rod to compress said resin into said first molding cavity when said transfer rod is moved downward;

a second transfer rod arranged in said movable plate member and having a flanger tip adapted to compress resin into said second molding cavity when said transfer rod is moved upwardly;

a second hydraulic cylinder arranged below said movable plate for selectively moving said movable plate and said second transfer rod upwardly and downwardly; and a controller for selectively controlling the movement of said first and second hydraulic cylinders whereby when said first mold is arranged between said fixed and movable plates, resin is compressed into said first loading cavity by said first transfer rod moving downwardly and when said second mold is arranged between said fixed and movable plates, said resin is compressed into said second molding cavity by said transfer rod moving upwardly.

* * * * *